United States Patent
Oklejas, Jr.

(10) Patent No.: US 8,691,086 B2
(45) Date of Patent: Apr. 8, 2014

(54) CONTROL SCHEME FOR A REVERSE OSMOSIS SYSTEM USING A HYDRAULIC ENERGY MANAGEMENT INTEGRATION SYSTEM

(75) Inventor: Eli Oklejas, Jr., Newport, MI (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 519 days.

(21) Appl. No.: 13/026,673

(22) Filed: Feb. 14, 2011

(65) Prior Publication Data
US 2011/0198290 A1  Aug. 18, 2011

Related U.S. Application Data

(60) Provisional application No. 61/305,292, filed on Feb. 17, 2010.

(51) Int. Cl.
*B01D 21/30* (2006.01)
*B01D 61/00* (2006.01)
*C02F 1/44* (2006.01)

(52) U.S. Cl.
USPC ............ 210/134; 210/87; 210/101; 210/137; 210/195.1; 210/195.2; 210/257.2; 210/321.65; 210/321.66; 210/637; 210/652

(58) Field of Classification Search
USPC ............ 210/87, 101, 134, 137, 195.1, 195.2, 210/257.2, 321.65, 321.66, 637, 652
See application file for complete search history.

(56) References Cited

U.S. PATENT DOCUMENTS

| | | |
|---|---|---|
| 4,966,708 A | 10/1990 | Oklejas et al. |
| 2007/0289904 A1 | 12/2007 | Oklejas |
| 2009/0289008 A1 | 11/2009 | Linnig et al. |

*Primary Examiner* — Dirk Bass
(74) *Attorney, Agent, or Firm* — Harness, Dickey & Pierce, P.L.C.

(57) ABSTRACT

A reverse osmosis system and method of operating the same includes a first pump receiving feed fluid at a first pressure and increasingly pressurizing the feed fluid to a second pressure higher than the first pressure. A membrane housing having an inlet, a membrane, a permeate outlet and a brine outlet. The inlet receiving feed fluid. A hydraulic energy management integration system (HEMI) having a turbine portion, a pump portion and a motor. The brine outlet fluid is in fluid communication with the turbine portion. The reverse osmosis system also includes a second pump and a controller controlling the motor to retard rotation of the HEMI while the first pump increasingly pressurizes the feed fluid to the second pressure. The controller also controls the motor to increase a HEMI speed so that feed fluid pressure increases above the second pressure after the second pressure is reached, and, when a feed fluid reaches the second pressure at the fluid inlet, controls the second pump to increase the feed fluid pressure to a third pressure. The controller controls the motor to reduce the HEMI speed after the third pressure and controls the motor to change the HEMI speed based on a membrane pressure.

28 Claims, 5 Drawing Sheets

CONTROL SCHEME FOR A REVERSE OSMOSIS SYSTEM USING A HYDRAULIC ENERGY MANAGEMENT INTEGRATION SYSTEM

CROSS-REFERENCE TO RELATED APPLICATIONS

This application claims the benefit of U.S. Provisional Application No. 61/305,292, filed on Feb. 17, 2010. The entire disclosure of the above application is incorporated herein by reference.

FIELD

The present disclosure relates generally to reverse osmosis systems and, more specifically, to a method and apparatus for operating a reverse osmosis system using a hydraulic energy management integration system.

BACKGROUND

This section provides background information related to the present disclosure which is not necessarily prior art.

Reverse osmosis systems are used to provide fresh water from brackish or seawater. A membrane is used that restricts the flow of dissolved solids therethrough. A reverse osmosis system involves pressurizing a solution with an applied pressure greater than an osmotic pressure created by the dissolved salt within the solution. The osmotic pressure is generally proportional to the concentration level of the salt.

To achieve the membrane operating pressures, pumps are used to increase a feed pressure to the membrane housing. Membrane manufacturers prefer that the feed pressure to the membranes increases gradually to minimize mechanical shock that may occur due to a relatively fast pressure rise.

Referring now to FIG. 1, a reverse osmosis system 10 is illustrated having a membrane array 12 that generates a permeate stream 14 and a brine stream 16 from a feed stream inlet 18. The feed stream inlet 18 typically includes brackish or seawater. A feed pump 20 is coupled to a motor 22 which pressurizes the feed stream to the required pressure flow which enters the membrane array 12 at the inlet 18. The motor 22 may be driven by a variable frequency drive (VFD) 24. The feed pump 20 may be referred to as a high-pressure pump.

Feed fluid from a pretreatment system 26 may provide the feed fluid to the high-pressure pump 20. The pretreatment system 26 may be provided to pre-treat the feed fluid prior to the membrane array 12. The pre-treatment system 26 may be used to remove solid materials such as sand, grit and suspended materials.

A low-pressure pump 28 coupled to a motor 30 may be referred to as a low-pressure pump. The low-pressure pump pressurizes the feed fluid from a feed input 32 to a first pressure. The low-pressure pump is the first pump in the system, whereas the high-pressure pump is the second pump. The low-pressure pump communicates pressurized feed fluid to the pretreatment system.

To prevent excessive mechanical shock, the variable frequency drive 24 starts the high-pressure pump 20 and motor 22 at a low speed then gradually increases the speed. Once a sufficient pressure has been achieved, permeate passing through a membrane 34 exits the housing 36 of the membrane array 12. Brine fluid exits the brine outlet 16. Flow regulation of the brine may be provided using a valve 40. Depressurized brine may then pass into drain 42. The permeate stream from the permeate outlet 14 is purified fluid at a relatively low pressure. The brine stream from the brine outlet 16 is at a higher pressure than the permeate stream and contains dissolved materials that were blocked by the membrane.

Referring now to FIG. 2, a similar reverse osmosis system 10' similar to that illustrated in FIG. 1 is illustrated with the addition of a feed throttle valve 50. The feed throttle valve 50 is used instead of the variable frequency drive 24 to prevent sudden excessive pressure at the membrane. In this case, the feed throttle valve 50 is installed between the high-pressure pump 20 and the membrane array 12. During startup, the valve 50 is nearly closed and is slowly opened. The high-pressure pump 20 rapidly ramps up to full pressure, typically in a few seconds. The control valve is thus used to obtain a gradual pressure rise at the membrane array 12.

SUMMARY

This section provides a general summary of the disclosure, and is not a comprehensive disclosure of its full scope or all of its features.

The present disclosure provides a method and system for controlling the pressure rise within a membrane array to protect the membranes from excessive mechanical stress.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
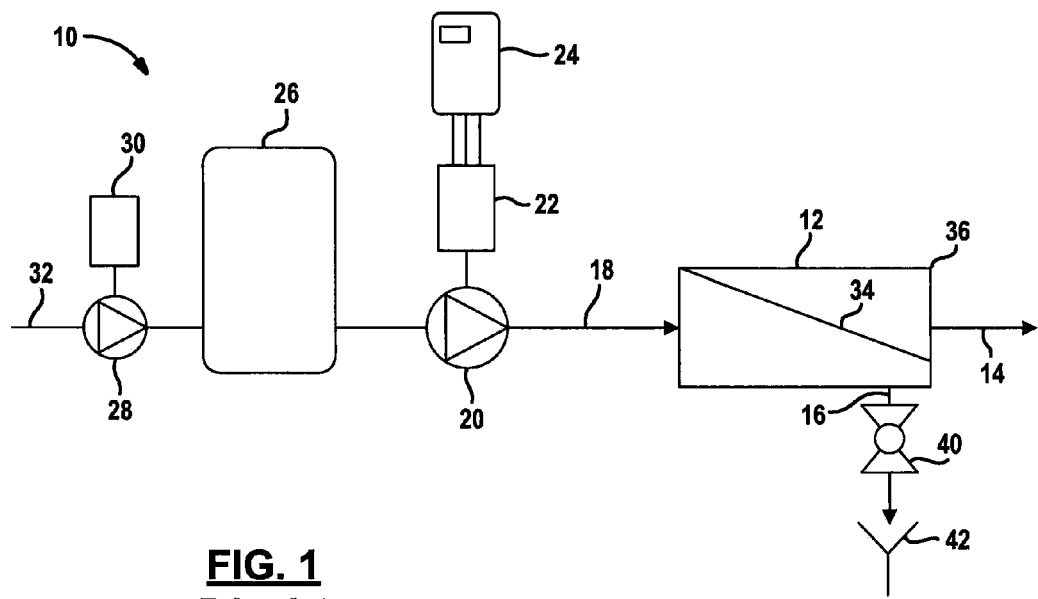
FIG. 1 is a schematic view of a reverse osmosis system according to the prior art.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
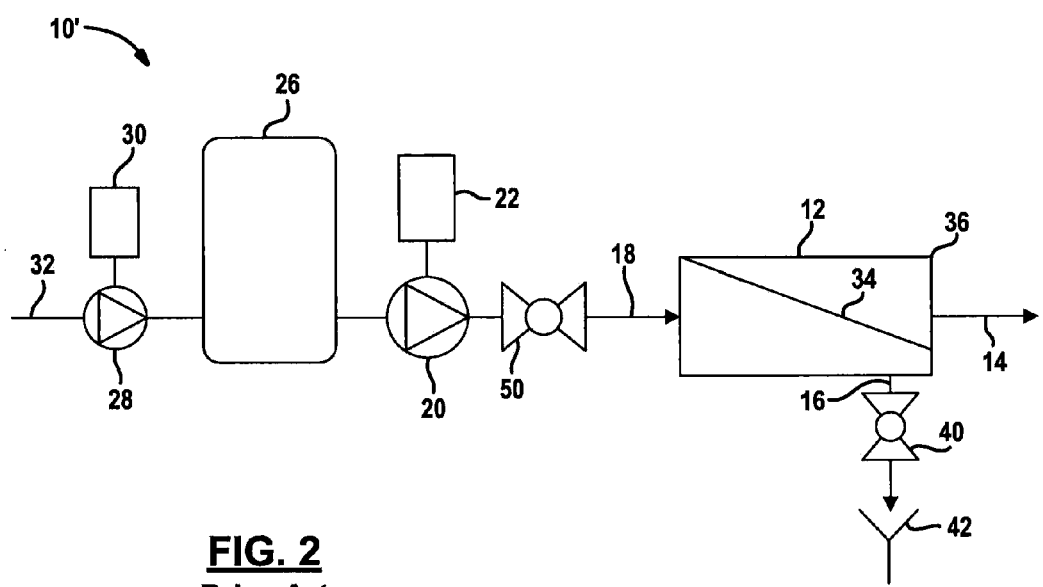
FIG. 2 is a schematic view of a second prior art reverse osmosis system.

A method and system for managing the pressure to the membrane array 12 is set forth. In the following description, the same reference numerals are used for the common components illustrated in FIGS. 1 and 2 above. In this embodiment, the motor 22 is not coupled to a variable frequency drive 24 as is illustrated in FIG. 1.

Figure 3:
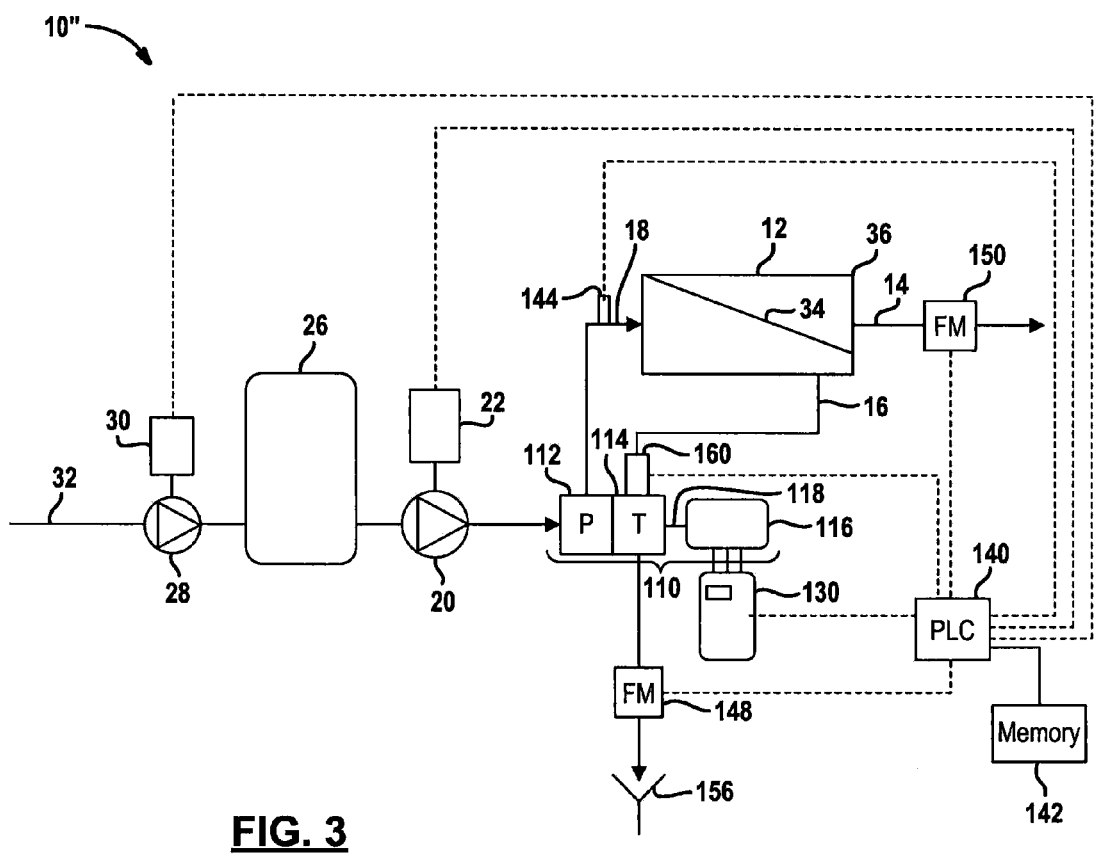
FIG. 3 is a schematic view of a reverse osmosis system according to the present disclosure.

Referring now to FIG. 3, a hydraulic energy management integration system (HEMI) is included into the reverse osmosis system 10″. The HEMI 110 includes a pump portion 112, a turbine portion 114, and a motor 116. The pump portion 112 receives feed fluid from the high-pressure pump 20 and communicates the fluid to the feed inlet 18 of the membrane array 12. The pump portion 112 may increase the pressure of the feed fluid when operating. It should be noted that the high-pressure pump 20 may also be selectively operated. For example, as will be described below, the high-pressure pump 20 may not be operated upon startup.

The HEMI 110 also includes a turbine portion 114. The turbine portion 114 is in fluid communication with the brine outlet 16. The turbine portion 114 and the pump portion 112 may include a common shaft 118. The turbine portion 114 rotates due to the high pressure from the brine outlet 16 which in turn is used to drive the pump portion 112 to increase the pressure of the feed fluid entering into the inlet 18.

The HEMI 110 may also include a motor 116. The motor 116 is operatively coupled to the turbine portion 114 and pump portion 112. The motor 116 may have a common shaft 118 with the turbine portion 114 and the pump portion 112. The motor 116 may also be coupled to a variable frequency drive 130. The variable frequency drive 130 may be used to control the motor 116 which in turn controls the speed of rotation of the turbine portion 114 and pump 112. The control of the variable frequency drive will be further described below.

A programmable logic controller (PLC) (hereinafter controller) 140 may also be used in the system to provide control as will be described below. The controller 140 may be microprocessor-based and include various memories, registers, input ports for receiving sensor and other inputs, output ports for controlling various components such as motors, valves or other devices. For example, the controller 140 may be coupled to the motors 30, 22 for controlling the starting, the operation speed and the stopping of the pumps 20, 28.

The controller 140 may also have a memory 142 associated therewith. The memory 142 may be used to store various preset pressurize profiles. The controller 140 is electrically coupled to a pressure sensor 144. The pressure sensor 144 generates a pressure signal corresponding to the input pressure to the membrane array 12. The pressure signal is communicated to the controller 140. By comparing the pressure signal to a desired pressure (or pressure profile), a desired pressure may be achieved.

A brine flow meter 148 is in communication with the flow of brine from the brine outlet 16 through the turbine portion 114. The flow meter 148 generates a brine flow signal corresponding to the flow of brine. The brine flow signal is communicated to the controller 140 from the brine flow meter 148. After the brine flow meter 148, the fluid is communicated to a drain 156.

A permeate flow meter 150 is in communication with the permeate outlet 14. The permeate flow meter 150 generates a permeate flow rate signal corresponding to the permeate flow out of the membrane array 12. The permeate flow is communicated to the controller 140.

A variable nozzle 160 is in fluid communication with the brine outlet 16 and receives the brine fluid therethrough. It should be noted that the variable nozzle may be physically part of the HEMI 110. The variable nozzle 160 has an adjustable area so that different amounts of brine fluid may be communicated to the turbine portion 114. The variable nozzle 160 may be controlled by the controller 140. Although a direct connection between the nozzle 160 and the controller 140 is illustrated, a valve actuator may be incorporated in the system to control the change in the variable nozzle.

In operation, the pressure sensor 144 provides feed pressure data to the controller 140. The desired pressure rise is preset within the controller 140. Generally, the controller 140 controls the variable frequency drive 130 to regulate the pressure in the membrane array 12.

Figure 4:
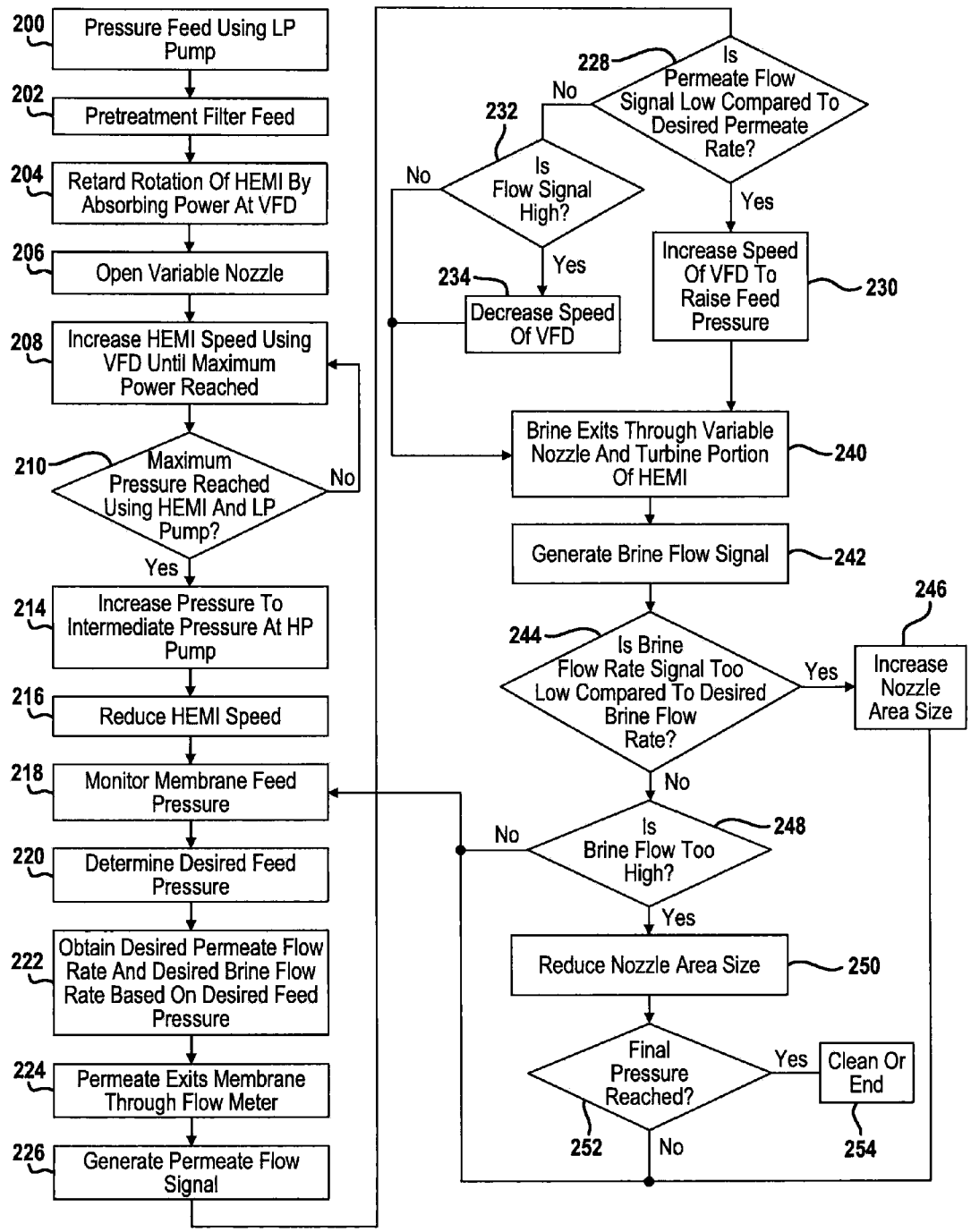
FIG. 4 is a flowchart of a method for operating the system of FIG. 3.

Referring now to FIGS. 3 and 4, a method for operating the system illustrated in FIG. 3 is set forth. In the first several steps a start-up process is described. Thereafter, the system operates under normal operating conditions for a desired time or a desired membrane pressure is reached. In step 200, feed fluid is received at an input 32 to the low-pressure pump 28. The low-pressure feed pump 28 pressurizes the feed fluid from a first pressure to a second pressure. The controller 140 may be used to control the motor 30 of the pump 28. The feed fluid flows through the high-pressure pump 20 which is not operating at this point. In a non-operating state the high-pressure pump 20 is not energized meaning it is not powered to rotate and increase the pressure to the feed fluid. The high-pressure pump 20 may rotate in response to the feed fluid flowing therethrough. The pressurized feed fluid also flows into the inlet 18 of the membrane array 12. Because of the relatively low pressure, little or no permeate passes through the membrane 34. The flow of fluid exits the brine outlet 16 and is communicated to the turbine portion 114. In step 204, the programmable logic controller commands the variable frequency drive 130 coupled to the HEMI 110 to absorb as much power as possible to retard the rotation of the HEMI 110. Absorbing power may be performed using a line regenerative variable frequency drive 130 which makes the VFD 130 act as a generator. Power may be absorbed in another type of device such as a bank of resistors.

It should be noted that the variable nozzle 160 may also be opened or nearly fully opened in step 206. By opening the variable nozzle 160 fully, flushed air trapped in the system may be removed.

After the low-pressure pump 28 has been started and fluid starts to flow through the system, the programmable logic controller 140 commands the variable frequency drive 130 to reduce the amount of power it is absorbing and allow the turbine portion 114 to begin to rotate. This takes place in step 208. This is performed until the maximum available power from the motor 116 is achieved. Under expected conditions, the maximum power of the motor 116 corresponds to a maximum pressure generated at the pump 112 together with the pressure of the low pressure pump 28.

In step 210, it is determined whether the maximum pressure has been reached. The maximum pressure is the maximum pressure corresponding to the HEMI 110 pressure generated by the pump 112 and the low-pressure pump at the inlet 18 based upon the signal from the pressure sensor 144. If the maximum pressure of the HEMI in combination with the low-pressure pump has not been reached, step 208 is again performed.

When the maximum pressure has been reached, step 214 is performed. In step 214, the high-pressure pump 20 is used to increase the pressure of the feed fluid to a third pressure above the pressure provided at the output of the low-pressure pump 28 and the pretreatment system 26. It should be noted that the pressure rise in steps 208 and 220 is performed according to a pressure profile stored within the memory 142 of the controller 140 illustrated in FIG. 3.

In step 214, when the pressure is increased at the high-pressure pump, the HEMI speed is reduced in step 216. The high-pressure motor 20 increases its speed rapidly and thus the controller 140 also reduces the speed of the motor 116 by controlling the variable frequency drive 30 which, in turn, reduces the speed of the pump portion 112 and the turbine portion 114 rotating on the common shaft 118.

The actual pressure for operation of the membrane is continually monitored using the pressure sensor 144. The controller 140 thus controls the variable frequency drive 130 so that the input pressure to the membrane array 12 is achieved. In step 218, the membrane pressure from the pressure sensor 144 is monitored. In step 220, the desired feed pressure according to the pressurization schedule or profile is determined. The pressure profile may take into account various operating conditions such as temperature, salinity and membrane fouling level. Based upon the desired feed pressure, a desired permeate flow rate and a desired brine flow rate may also be determined.

As mentioned above, it may be desirable to continually increase the pressure input to the membrane array 12 because of the gradual reduction in fluid passing through the membrane array 12 due to fouling. The reduction in fluid through the membrane results in a reduced amount of permeate unless the input pressure is increased.

The rest of the process is considered the normal operating process which occurs after the startup of the system. In step 224, the permeate exits the membrane through the flow meter 150. In step 226, a permeate flow signal is generated. In step 228, it is determined whether the permeate flow signal is low compared to the flow rate determined in step 222 as compared to the pressure profile. If the permeate fluid flow is low, step 230 increases the speed of the variable frequency drive to raise the feed pressure. In step 228, if the permeate flow signal is not low, it is determined whether the permeate flow signal is high. If the permeate flow signal is high in step 232, step 234 decreases the speed of the variable frequency drive.

After steps 234, 230 and 232, in step 240 the brine exits through the variable nozzle 160 and turbine portion 114 of the HEMI 110. In step 242, a brine flow signal is generated by the brine flow meter 148. In step 244, if the brine flow rate is low compared to the desired brine flow rate as determined in step 222, step 246 increases the size of the nozzle area which increases the amount of brine flow into the turbine portion 114 of FIG. 3.

Referring back to step 244, if the brine flow rate is not low compared to the brine flow rate signal, step 248 determines whether the brine flow is too high. If the brine flow is too high, step 250 reduces the nozzle area size, thus reducing the flow into the turbine portion 114 of the HEMI 110. After steps 246, 248 and 250, the system then again returns to step 248 until a final pressure is reached in step 252. When a final pressure has been reached in step 252 according to the pressure profile, step 254 ends the process. When a final pressure has not been reached, step 218 is again repeated. It should be noted that steps 226-234 may be performed sequentially as illustrated and described or simultaneously. They may also be performed in a reverse order so that the brine fluid flow is corrected first then the permeate flow is corrected.

A couple aspects of the invention are of note. One is that during startup of a large motor such as the high-pressure pump, a large surge in electrical power creates considerable heat in the motor windings. In the present configuration, the motor 20 has feed fluid flowing therethrough and thus when the high-pressure pump 20 is started, the surge in electricity is reduced. Thus, a lower power demand is required by the motor 20. Also, during shutdown, the HEMI 110 maintains substantial flow through the high-pressure pump after the motor 20 has been de-energized. The freely-spinning motor will thus have time to cool.

Figure 5:
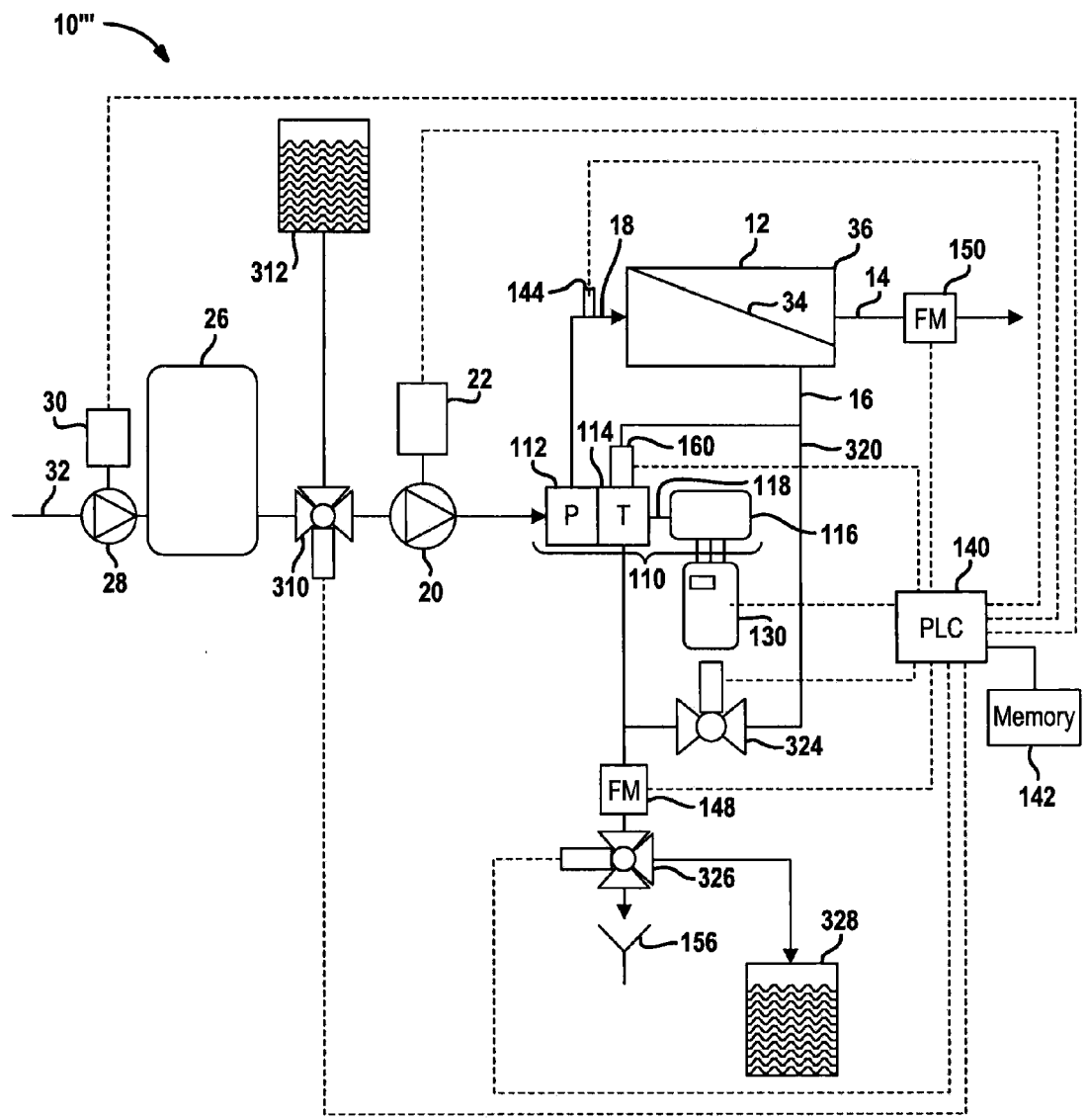
FIG. 5 is a schematic view of the reverse osmosis according to FIG. 3 that includes additional components for cleaning or flushing the membrane array 12.

Referring now to FIG. 5, the configuration of FIG. 3 is repeated with the addition of the components used for cleaning or flushing to form the reverse osmosis system 10'''. In this figure, the same components are provided with the same reference numerals and thus they will not be described further below. The additional components in this figure include a three-way valve 310 in fluid communication with a tank 312. The tank 312 may include cleaning solution or water for flushing the system and refreshing a fouled membrane. The three-way valve 310 during cleaning or flushing of the membrane array 12, blocks the flow of feed fluid from the pretreatment system 26 and the low-pressure pump 28 and allows the contents of tank 312 to be communicated to the membrane array 12. The valve 310 is electrically controlled by the controller 140.

Another additional component during the cleaning process is a bypass pipe 320 which includes a bypass valve 324 which is electrically controlled by the controller 140. The bypass pipe 320 receives brine fluid from the brine outlet 16 and bypasses the turbine portion 114. The bypass pipe 320 is fluidically coupled to the outlet of the turbine portion 114 prior to the flow meter 148. It should be noted that the fluid through the bypass pipe 320 and the fluid through the turbine portion 114 combine and flow through the flow meter 148.

Another valve 326 is used for redirecting any cleaning fluid to a disposal tank 328. Should the fluid be permeate or water, the valve 326 routes the fluid to the drain 156.

Figure 6:
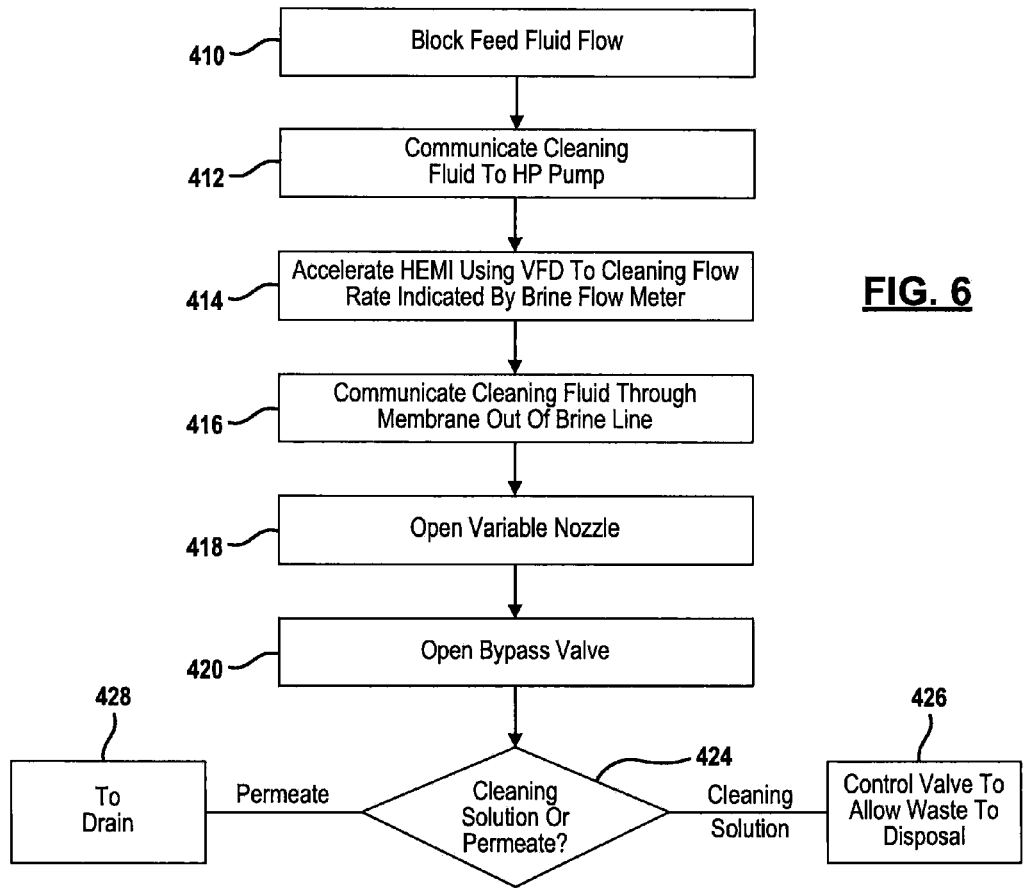
FIG. 6 is a flowchart of a method for operating the cleaning portion of FIG. 5.

Referring now to FIGS. 5 and 6, the operation of the cleaning method is set forth. In step 410, the valve 310 of FIG. 5 is controlled so that feed fluid flow is blocked from the pretreatment filter system 26 in step 410. In step 412, the cleaning fluid is communicated to the high-pressure pump 20 from the tank 312. The pump 20 may not be operated in the cleaning process. In step 414, the HEMI 110 is controlled so that it accelerates. The controller 140 controls the variable frequency drive 130 which, in turn, drives the motor 116 to accelerate the HEMI to operate the pump 112 to obtain a desired cleaning flow rate as determined by the controller. The controller 140 may set the cleaning flow rate to a cleaning flow rate profile based on the cleaning fluid flow rate signal from the flow meter 148 or the pressure signal from the pressure sensor 144. Feedback is provided regarding the flow rate of the fluid exiting the brine output 16. Feedback is also provided to the input pressure from the pressure sensor 144. By energizing the variable frequency drive 130, the feed fluid pressure is increased by the pump 112. The cleaning fluid is pumped from the tank 312 into the membrane array 12. In step 416, the cleaning fluid is communicated from the membrane array 12 and out of the brine outlet 16. In step 418, the variable nozzle 160 is opened. The variable nozzle may be opened at any time of the cleaning process including directly after or during step 410. In step 420, the bypass valve 324 is opened. In step 424, if there is cleaning solution in the system, step 426 controls the three-way valve 326 to redirect the cleaning fluid to a disposal tank 328. The controller 140 is used for such control.

In step 424, if the flushing solution is merely permeate or water, step 428 routes the permeate to the drain. The controller 140 controls the valve 326 to allow the permeate to pass to the drain 156 rather than the tank 328.

The cleaning process may take place for a predetermined amount of time or until the cleaning fluid 312 has been exhausted from the cleaning tank. Those skilled in the art will recognize that the cleaning process may be varied.

Figure 7:
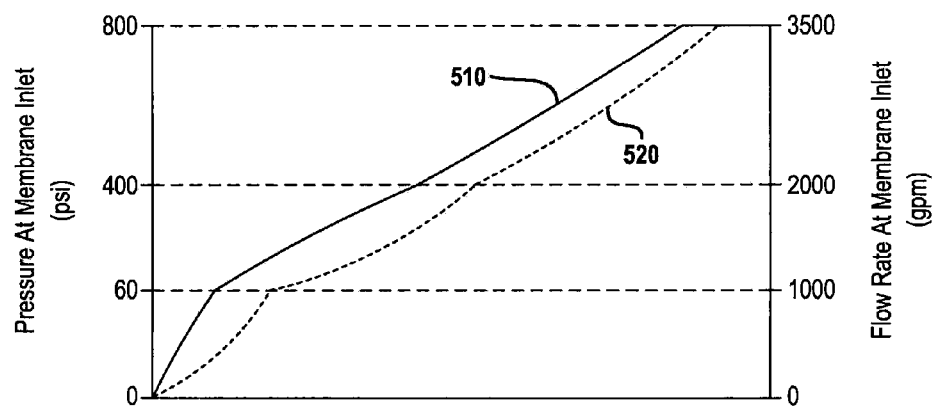
FIG. 7 is a plot of pressure versus time for an operating profile.

Referring now to FIG. 7, a pressure profile was referred to in the control of the system. A pressure profile 510 and a flow rate profile 520 for the membrane inlet is generally illustrated. As can be seen, the pressure increases over time until the end of the process.

In one example, the operation of the system can be described in three separate phases. In the first phase, the low-pressure pump is powered to operate and the variable frequency drive is used to absorb the power from the HEMI. In this example, the pressure between the pretreatment system and the high-pressure pump is 50 psi and the flow rate is 1,000 gallons per minute (gpm). At the same time the pressure between the high-pressure pump and the pump portion of the HEMI is 40 psi and the flow rate is 1,000 gpm. At the inlet to the membrane array the pressure is 60 psi and the flow rate is 1,000 gpm. The pressure and flow rate at the permeate outlet is zero. The flow rate at the brine outlet of the membrane assembly is 55 psi and the flow rate is 1,000 gpm. The pressure at the flow meter downstream of the turbine portion is 15 psi and the flow is 1,000 gpm.

Next, the variable frequency drive gradually adds power (reduces the amount of power absorbed) until the HEMI motor is at a maximum output. At this point, the low-pressure pump is fully operating. At this point, the pressure between the pretreatment system and the high-pressure pump is 50 psi and the flow rate is 2,000 gpm. The pressure between the high-pressure pump and the pump portion is 10 psi and the flow rate is 2,000 gpm. The inlet pressure to the membrane assembly is 400 gpm and the flow rate is 2,000 psi. The permeate outlet pressure and flow rate is zero at this point. The pressure at the brine outlet of the membrane assembly is 380 psi and the flow rate is 2,000 gpm. The flow rate at the flow meter downstream of the turbine portion is 15 psi and the flow rate is 2,000 gpm.

Thereafter, the high-pressure pump is started and comes to full power. The pressure between the pretreatment system and the high-power pump is 50 psi and the flow rate is 3,500 gpm. The pressure between the high-pressure pump and the pump portion is 400 psi and the flow rate is 3,500 gpm. The pressure at the inlet to the membrane assembly is 800 psi and the flow rate is 3,500 gpm. The permeate outlet pressure is 10 psi and the flow rate is 1,000 gpm. The brine outlet pressure is 760 psi and the flow rate is 2,500 gpm. The pressure at the flow meter is 15 psi and the flow rate is 2,500 gpm.

The above numbers are provided for example only. Of course, for different size motors and other operational constraints, the pressures in flow rates may be changed. What is clear is that a predetermined startup method with controlled pressures is set forth to reduce the mechanical strain within the membrane assembly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of operating a reverse osmosis system comprising:
receiving feed fluid at a first pressure;
increasingly pressurizing the feed fluid to a second pressure higher than the first pressure using a first pump;

communicating the feed fluid to an inlet of a membrane housing, said membrane housing having a membrane, a permeate outlet and a brine outlet;

communicating brine outlet fluid from the brine outlet to a turbine portion of a hydraulic energy management integration system (HEMI);

retarding rotation of the HEMI while increasingly pressurizing the feed fluid to the second pressure;

thereafter, increasing HEMI speed so that feed fluid pressure increases above the second pressure;

when a feed fluid reaches the second pressure, increasing the feed fluid pressure to a third pressure using a second pump;

while increasing the feed fluid pressure to the third pressure, reducing the HEMI speed; and changing the HEMI speed based on a membrane pressure.

2. A method as recited in claim 1 wherein communicating the feed fluid to an inlet of a membrane housing comprises passing the feed fluid through the second pump prior to the inlet of the membrane housing.

3. A method as recited in claim 1 wherein communicating the feed fluid to an inlet of a membrane housing comprises passing the feed fluid through a second pump prior to the inlet of the membrane housing and not operating the second pump until the step of increasing the feed fluid pressure to a third pressure.

4. A method as recited in claim 1 wherein communicating the feed fluid to an inlet of a membrane housing comprises passing the feed fluid through a second pump prior to the inlet of the membrane housing and not operating the second pump while rotating the pump with the feed fluid until the step of increasing the feed fluid pressure to a third pressure.

5. A method as recited in claim 1 further comprising passing the feed fluid through a pretreatment filter between the first pump and the second pump.

6. A method as recited in claim 1 wherein changing the HEMI speed comprises changing the HEMI speed based on a pressure profile.

7. A method as recited in claim 1 further comprising generating a permeate flow rate signal and a brine flow rate signal.

8. A method as recited in claim 7 wherein changing the HEMI speed comprises changing the HEMI speed based on the membrane pressure, the permeate flow rate signal and the brine flow rate signal.

9. A method as recited in claim 8 further comprising changing an opening of a variable nozzle in response to brine flow rate signal.

10. A method as recited in claim 8 wherein changing the HEMI speed comprises changing the HEMI speed based on the membrane pressure and the permeate flow rate signal.

11. A method as recited in claim 1 wherein changing the HEMI speed comprises changing the HEMI speed until a final pressure is reached.

12. A method as recited in claim 1 further comprising cleaning the membrane housing.

13. A method as recited in claim 12 wherein cleaning the membrane housing comprises:
blocking feed fluid flow from the first pump;
coupling cleaning fluid to the membrane housing; and
opening a variable nozzle into the turbine portion of the HEMI.

14. A method as recited in claim 13 further comprising opening a bypass pipe and at least partially bypassing the turbine portion.

15. A method as recited in claim 14 further comprising generating a cleaning fluid flow signal corresponding to cleaning fluid flow through the bypass pipe and through the turbine portion and controlling the HEMI speed based on the cleaning fluid flow signal.

16. A method as recited in claim 1 further comprising routing cleaning fluid to a disposal tank.

17. A reverse osmosis system comprising:
a first pump receiving feed fluid at a first pressure and increasingly pressurizing the feed fluid to a second pressure higher than the first pressure;
a membrane housing having an inlet, a membrane, a permeate outlet and a brine outlet, said inlet receiving feed fluid;
a hydraulic energy management integration system (HEMI) having a turbine portion, a pump portion and a motor, wherein fluid from the brine outlet is in fluid communication with the turbine portion,
a second pump; and
a controller controlling the motor to retard rotation of the HEMI while the first pump increasingly pressurizes the feed fluid to the second pressure, controlling the motor to increase a HEMI speed so that feed fluid pressure increases above the second pressure after the second pressure is reached and, when the feed fluid reaches the second pressure at the inlet, controlling the second pump to increase the feed fluid pressure to a third pressure, said controller controlling the motor to reduce the HEMI speed after the third pressure and controlling the motor to change the HEMI speed based on a membrane pressure.

18. A system as recited in claim 17 wherein the second pump is unenergized before the third pressure is reached.

19. A system as recited in claim 17 further comprising a pretreatment filter between the first pump and the second pump.

20. A system as recited in claim 17 wherein the controller changes the HEMI speed based on a pressure profile.

21. A system as recited in claim 17 further comprising a first flow meter generating a permeate flow rate signal and second flow meter generating a brine flow rate signal.

22. A system as recited in claim 21 wherein the controller controls the motor to change the HEMI speed based on the membrane pressure, the permeate flow rate signal and the brine flow rate signal.

23. A system as recited in claim 21 further comprising a variable nozzle in communication with the turbine portion in response to brine flow rate signal.

24. A system as recited in claim 21 wherein the controller controls the motor to change the HEMI speed based on the membrane pressure and the permeate flow rate signal.

25. A system as recited in claim 17 wherein further comprising a cleaning tank having cleaning fluid therein, a first three way valve in communication with the cleaning tank, the first pump and the second pump, said controller controlling the valve to block feed fluid flow from the first pump and communicate cleaning fluid to the membrane housing.

26. A system as recited in claim 25 further comprising a bypass pipe coupled between the brine outlet and a brine flow meter to at least partially bypassing the turbine portion.

27. A system as recited in claim 26 wherein the brine flow meter generates a cleaning fluid flow signal corresponding to cleaning fluid flow through the bypass pipe and through the turbine portion, said controller controlling the motor to control the HEMI speed based on the cleaning fluid flow signal.

28. A system as recited in claim 17 further comprising a disposal tank and a second three way valve that communicates cleaning fluid to the disposal tank.

* * * * *